April 29, 1969 L. A. SCHLABACH 3,441,823
TACHOMETERLESS INDUCTION MOTOR SPEED CONTROL
Filed July 13, 1966
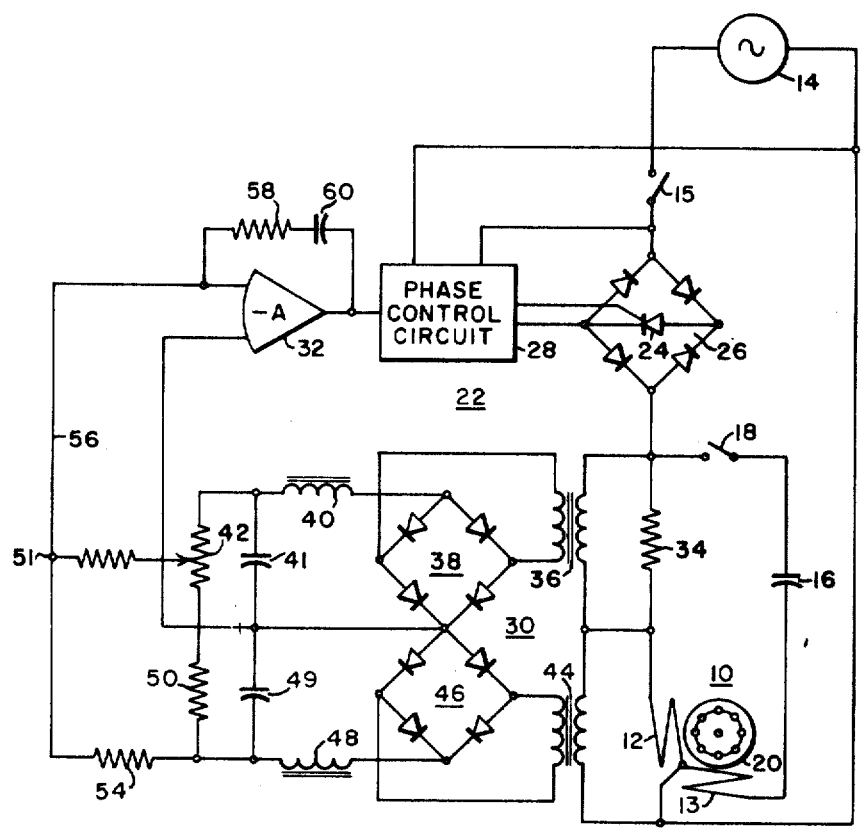
WITNESSES
Leon M. Garman
E. Strickland
INVENTOR
Leland A. Schlabach
BY F. V. L.
ATTORNEY

United States Patent Office 3,441,823
Patented Apr. 29, 1969

3,441,823
TACHOMETERLESS INDUCTION MOTOR SPEED CONTROL
Leland A. Schlabach, Pittsburgh, Pa., assignor to Westinghouse Electric Corporation, Pittsburgh, Pa., a corporation of Pennsylvania
Filed July 13, 1966, Ser. No. 564,807
Int. Cl. H02k *17/04;* H02p *1/42*
U.S. Cl. 318—221                10 Claims The present invention relates to speed control systems for single phase alternating current motors, and particularly to speed control systems capable of sensing the speed of single phase motors without the use of a tachometer.

Speed control for single phase induction motors can be achieved by controlling the time portion of each half cycle of source voltage which is applied to the motor primary winding. The effective magnitude of applied voltage is thus made variable to regulate the motor speed to a preset value without requiring that the voltage source itself be made variable, and without requiring that the motor be subjected to the torque pulsing effects of controlled application or withholding of full half cycles of source voltage. The frequency of the applied voltage can also be controlled to achieve speed regulation, but this is essentially a different and unrelated approach to the problem.

To obtain control of the point in time at which each voltage half cycle is applied to the motor, a switch is phase controlled to be fired at the appropriate time point in each half cycle according to speed regulation requirements. The phase control can be achieved by means of circuitry responsive to a speed indicating feedback parameter such as the voltage output of a tachometer generator driven by the motor. Such a control means is shown and described in copending application Ser. No. 406,981, filed Oct. 28, 1964, now abandoned, by the present inventor and assigned to the present assignee.

With the means described in the copending application, a tachometer generator produces an alternating current output which is rectified and filtered to provide a direct current feedback voltage which is compared to a preset direct current reference voltage to produce a phase circuit (speed representing) control voltage. The phase circuit controls the point in time in each supply voltage half cycle at which the phase switch is fired and accordingly regulates the motor in a stable manner in accordance with a preset speed.

For any particular motor speed and slip, the motor input impedance remains substantially constant as the load is varied. The input impedance would remain almost perfectly constant except that the motor magnetizing impedance does not remain perfectly linear. With induction motors, the input impedance was found to remain reasonably fixed for a given motor speed and a varying load. The present disclosure utilizes this phenomenon to describe a highly efficient and reliable feedback speed control circuit for a single phase induction motor which does not require the use of a tachometer.

In accordance with the principles of the present invention, the voltage and current in the main winding of a motor are separately sensed and electrically compared to produce a difference signal when and if the voltage and current are not related by a predetermined proportion. The difference signal is applied to phase control (retard or advance) the firing angle of a semiconductor controlled rectifier device functioning to control the magnitude of the voltage supplied to the motor. With a change in the load on the motor, there is a slight and reciprocal change in motor speed and input impedance (with an increased load, there is a consequent decrease in speed and impedance, and vice versa). With the change in impedance, there is, of course, a reciprocal change in the amount of current flow which, when compared with the main winding voltage, produces the difference signal that functions in the manner described above. With the change in applied voltage, the motor speed, of course, is changed (corrected) accordingly.

In the system of the present disclosure, to be more fully described hereinafter, all components are static (solid state) except the motor itself. Thus the advantages of operating reliability, packaging convenience and a minimum of maintenance can be realized by using static devices and arrangements in the speed control circuit art as opposed to the use of tube devices such as thyratrons. Operational stability is characteristic of the present system because the feedback arrangement functions quickly and positively to correct the applied voltage before substantial changes in motor speed occur as a result of changes in load. The inertia of the motor naturally opposes a change in motor speed thus limiting the rate at which the motor speed can be returned to its original value. The stability of the present system is further enhanced by the fact that the feedback circuit substantially eliminates circuit oscillation by limiting the feedback gain of high frequency signals.

It is therefore an object of the present invention to provide an efficient and effective speed control system for a single phase motor without the use of a tachometer.

Another object of the invention is to provide a reliable yet inexpensive control arrangement for a single phase motor in which the speed of the motor is accurately and stably controlled.

A further object of the invention is to provide a tachometerless speed control circuit for a single phase motor in which the input impedance of the motor is caused to remain constant thereby maintaining the motor speed substantially constant.

Yet another object of the invention is to provide a unique single phase motor control circuit having a positive feedback effect and thus an inherently high feedback circuit gain.

Another object of the invention is to provide a solid state motor control circuit having no movable parts so that existing motors already installed can be simply and inexpensively modified where it is desired to vary the speed of the motor.

A more specific object of the invention is to provide an efficient motor speed control circuit using a semiconductor device in a switching mode to control the supply of voltage to the motor winding in response to an output signal from a phase control circuit sensing the ratio of winding current to winding voltage.

These and other objects of the invention will become more apparent from the following detailed description taken in connection with the accompanying drawing in which:

The single figure is a schematic diagram of an illustrative embodiment of the invention.

More specifically, there is shown in the figure a capacitor start, single phase alternating current induction motor 10 having a main field winding 12 and an auxiliary field winding 13. The motor 10 is characterized as a single phase motor since it is energized by a single phase AC source 14. The AC source voltage is applied to motor 10 through a line switch 15.

The auxiliary winding 13 is serially connected with a phase shifting start capacitor 16 and a switch means 18 in a well known manner and generally designated as the starting circuit. Switch means 18 may be centrifugally actuated to open the starting circuit after power is applied and the motor has attained a predetermined starting or running speed. Other switching means may be used such as the relay device shown in the above-mentioned copending application. Excessive and possibly damaging auxiliary winding current is accordingly avoided by the timely disconnection of the starting capacitor 16 and auxiliary winding 13.

The motor 10 further comprises a rotor 20 having a shaft (not shown) disposed to drive a load (not shown) over a relatively wide range of regulated speeds in a manner to be more fully explained hereinafter.

To control the energization of the motor 10 and thereby control the speed of the motor, there is provided a feedback control arrangement generally designated 22 including a semiconductor switching device 24 in this instance in the form of a semiconductor controlled rectifier. The switching device 24 is connected with its cathode and anode terminals in series with the motor winding circuits and the voltage source 14 through the line switch 15. A diode bridge 26 is connected in series with the controlled rectifier for purposes of efficiently operating the controlled rectifier in a switching (on-off) mode and directing both the positive and negative components of alternating current in the forward direction through the phase switch 24 while current through the winding circuits alternates in direction.

A phase control circuit 28 (only representatively shown) is included in the feedback control arrangement 22 for the purpose of controlling the point in time at which the switching device 24 is fired in each half cycle of the alternating current source voltage. That is, the phase control circuit 28 responds to a feedback speed control voltage to regulate the portion of each source voltage half cycle during which the switching device 24 is conductive and accordangly the portion of each source voltage half cycle during which the motor 10 is energized so as to regulate the speed of the motor at a preset value.

The device 24 may be fired relatively early or relatively late in each half cycle of the source voltage. An irregular shaped or pulse-like voltage is thus applied to the windings of motor 10. The effective voltage applied to the motor windings increases in magnitude as the device 24 is fired earlier in the source voltage half cycles. Conversely, the voltage magnitude applied to the motor windings decreases as the device is fired later in the source voltage half cycles. One such phase control circuit arrangement is shown and described in the above-mentioned copending application. Another phase control arrangement is shown and described in copending application Ser. No. 388,845, filed by Leonard C. Vercellotti on Aug. 11, 1964, and assigned to the present assignee. In the present invention any suitable phase control circuit may be used to control the operation of the device 24.

A motor speed representative voltage signal is developed in the feedback circuit by the circuit arrangement generally designated 30, the output of which is applied to an amplifier 32 to produce the previously mentioned speed control voltage applied to the phase control circuit 28.

The motor speed representative signal is developed by sensing the voltage and current in the main winding 12 of motor 10. The current signal is obtained from a low resistance resistor 34 connected in series with the main motor winding 12. The voltage drop across the resistor is sensed and stepped up by a transformer 36 which may be a filament transformer. The stepped up voltage is rectified and filtered by a diode bridge 38 and an LC circuit (comprising inductor 40 and capacitor 41), respectively, to obtain a direct current voltage signal proportional to the average of the motor main winding current. The direct current signal is developed across a potentiometer resistor 42, the potentiometer providing means for adjusting the amount of the current representative signal feedback to the amplifier 32 and the consequent adjustment of motor speed in a manner to be more fully explained hereinafter.

The voltage in the main winding 12 of the motor 10 is measured by a step down transformer 44 which may also be a filament transformer. The primary of the transformer is connected across the main winding 12, as shown in the figure, so that a low voltage output is developed in the secondary of transformer 44 when the motor is energized. The low voltage is rectified and filtered by a second diode bridge 46 and LC circuit (comprising inductor 48 and capacitor 49), respectively, to obtain a direct current voltage signal proportional to the average voltage across the main winding 12 of the motor. The direct current signal is developed across the resistor 50 which has a common junction with potentiometer resistor 42 and filter capacitors 41 and 49. All of the signal developed across the resistor 50 is fed back to amplifier 32.

The magnitudes of the signal voltages developed across resistors 42 and 50 are applied to a circuit junction 51 through current limiting resistors 52 and 54, respectively, where the two signals are algebraically summed to provide the previously mentioned motor speed representative signal. If the main winding voltage and current are related by the desired proportion, no difference signal is developed at junction 51 to order a change in the magnitude of the voltage applied to the main motor winding 12. That is, the motor speed (and thus the correct input impedance) is at a desired value. Mathematically, the relationship of the motor speed (impedance) to main winding voltage and current may be expressed $$Z = E/I$$

However, with a change in motor speed (and thus motor impedance) from the desired value, the current will change accordingly in the main winding 12, thereby changing the current representing signal developed across potentiometer resistor 42. This signal change effects the ratio of current to voltage at junction 51 so that a difference signal is now produced for ordering a change in the magnitude of the voltage applied to motor 10. This difference signal is applied to the input of amplifier 32 as indicated by conductor 56. Thus, the difference signal is the above-mentioned motor speed representative signal when a change in load changes the motor speed from a desired value. When the motor is running at the desired speed, the motor speed representative signal (produced at junction 51) is a zero signal.

It should be noted that since the two signal voltages are both rectified and filtered before their magnitudes are compared electrically, the phase angle between the voltage and current of the motor winding 12 does not directly affect the feedback voltage and current signals. Further, the LC circuits filter out rapid (high frequency) changes in motor speed so that only low frequency signals are fed back as control signals, thereby preventing the system from oscillating, which results in increased stability of operation.

The amplifier 32 may be of the type generally known as operational amplifiers which are direct current amplifiers with feedback impedance arrangements designed to perform algebraic functions in such devices as analog computers though the invention is not limited thereto. The mathematical functions performed by operational amplifiers are determined mainly by the feedback arrangement. In the present case, amplifier 32 is provided with a series resistor-capacitor feedback network comprising resistor 58 and capacitor 60 which provides the amplifier with a unity voltage gain characteristic and an ability to function as an integrator. The resistance value of resistor 58 is chosen (in conjunction with the resistors 42, 50, 52 and 54) to give the unity voltage gain characteristic, and thus a highly linear amplification factor, while simultaneously providing an ample current gain characteristic needed for effectively controlling the operation of phase control circuit 28 to assure a reasonable response time and thus stable operation of the system. Preferably, the current limiting resistors and the feedback resistor are of the same resistance value to obtain the gain characteristics needed with the voltage feedback from transformers 36 and 44. In a similar manner, the RCL components employed to develop the winding current and voltage representative signals are also of equal value.

The integration function performed by feedback capacitor 60 supplies a stable, steady state signal to the phase control circuit 28 (and thus to the switching device 24) when the motor is running at the desired speed and no difference signal appears at the junction 51. Otherwise, the switching device would turn completely off removing the supply potential (or the proper preset portion thereof) to the motor. Though an operational amplifier has been shown and described as the means for controlling the firing times of the phase control 28, other means may be employed in place thereof with equal or similar facility without departing from the spirit and scope of the invention. In other words, any static control means may be used which responds to the signal at the junction 51 and actuates the control 28 in a manner to maintain the signal equal to zero.

The overall operation of the system may best be described with the system in a stable, steady state condition. If the load on the motor 10 is subsequently increased, the motor speed and thus motor input impedance will be slightly reduced. The input current, therefore, increases slightly, increasing the current feedback signal. The increased current feedback signal changes the current to voltage ratio thereby producing a difference signal at junction 51 which is applied to the phase control circuit 28 to advance the firing angle of phase switch 24 which in turn increases the voltage applied to the motor. The increased motor voltage in turn causes the motor current to further increase. This sequence of events continues until either the full line voltage is applied to the motor 10 or the motor speed has increased to the desired value (preset by potentiometer 42) due to the higher motor current and resultant torque.

When the motor speed reaches the desired value, the input current and voltage to the motor main winding 12 would then have the required ratio to produce the zero difference signal. If at this point, the power input to the motor is greater than required, the motor speed would tend to increase further. However, with the presently disclosed arrangement two stabilizing effects occur when or if the speed of the motor 10 does increase above the desired value. The first effect is that the main winding input impedance is increased which causes the motor input current and resulting motor torque to decrease reducing the tendency to overspeed. The second effect is a result of the first. That is, the decrease in current functions to retard the firing angle of the phase switch 24 to reduce the voltage applied to the motor. The input voltage and current are thereby forced to decrease until the motor speed decreases. The operation of circuit, therefore, tends to force the motor 10 to increase or decrease its speed of operation toward the desired value.

It should now be apparent from the foregoing description that a new and useful motor speed control system has been disclosed that measures the speed of the motor without the use of a tachometer. This is accomplished by sensing the voltage and current in the main motor winding and feeding back a resultant difference signal with a simple yet reliable circuit arrangement that requires only low cost, solid state components. Further, the simplicity and economy of the arrangement permits easy modification of motors already installed in existing equipment; no mechanical changes are necessary because the motor speed is measured electronically without the use of mechanical devices such as tachometers.

What is claimed is:

1. A speed control system for an induction motor having field windings, said system comprising:
   means for sensing the impedance of the circuit of at least one of said field windings and for developing an output signal determined by said impedance,
   means for applying a voltage to said circuit including a switching means serially connected in said circuit, and further connected to receive the output signal determined by said circuit impedance,
   said switching means being effective to control the magnitude of the voltage applied to said circuit in response to changes in said output signal in a manner which maintains an essentially zero change in the speed of said motor.

2. A speed control system as defined in claim 1 in which the sensing means includes means for sensing the current in the field winding circuit, means for sensing the voltage across the field winding, and means for developing an output signal determined by the ratio of said current and voltage.

3. The speed control system as defined in claim 1 including a resistance means connected in electrical series with the field winding, said sensing means including means for sensing the voltage drop across the resistance means and the voltage across the field winding.

4. The speed control system as defined in claim 2 including means for adjusting the ratio of said current and voltage to change the predetermined speed.

5. The speed control system as defined in claim 2 in which the current and voltage sensing means are adapted to produce respective current and voltage representative signals, the output signal developing means including circuit means for algebraically summing the current and voltage representative signals.

6. The speed control system as defined in claim 5 including means for adjusting the magnitude of the current representative signal.

7. The speed control system as defined in claim 1 in which the means for supplying a controllable voltage includes a semiconductive switching device, the output signal responsive means including a phase control circuit for controlling the switching device.

8. A speed control system for a motor having main and auxiliary windings energizable from a suitable alternating current source, the system comprising a semiconductor switching device connected in series with at least the main winding for controlling the magnitude of supply voltage applied to the motor from the source, means for producing a direct current feedback voltage representing the speed of the motor, said means including means for sensing voltage and current parameters in the circuit of the main winding and comparing the parameters to produce the speed representing voltage, and a phase control circuit adapted to respond to the speed representing voltage to control the point in time at which the switching device is fired in each half cycle of source voltage to operate the motor at fixed selectable speeds.

9. The system of claim 8 in which a circuit means having a predetermined gain characteristic is connected to receive the speed representating voltage and in response thereto produce a signal adapted to control the operation of the phase control circuit.

10. The system of claim 8 in which the current parameter is obtained by measuring the voltage drop across a resistance means connected in electrical series with the main winding, and the voltage parameter is obtained by measuring the voltage applied across the main winding of the motor.

References Cited

UNITED STATES PATENTS

| 2,876,406 | 3/1959 | Charbonneaux et al. | 318—227 |
| 3,189,810 | 6/1965 | MacGregor | 318—227 |
| 3,331,003 | 7/1967 | King | 318—227 XR |
| 3,348,109 | 10/1967 | Wright | 318—227 XR |

ORIS L. RADER, *Primary Examiner.*

G. Z. RUBINSON, *Assistant Examiner.*

U.S. Cl. X.R.

318—227, 230, 345